United States Patent
Shimizu et al.

(10) Patent No.: US 7,630,651 B2
(45) Date of Patent: Dec. 8, 2009

(54) METHOD AND APPARATUS FOR CONTROLLING BIAS POINT OF OPTICAL TRANSMITTER

(75) Inventors: Kazuyoshi Shimizu, Kawasaki (JP); Akira Nagayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 447 days.

(21) Appl. No.: 11/357,116

(22) Filed: Feb. 21, 2006

(65) Prior Publication Data

US 2007/0092266 A1   Apr. 26, 2007

(30) Foreign Application Priority Data

Oct. 21, 2005  (JP) ............................... 2005-307420

(51) Int. Cl.
*H04B 10/04* (2006.01)
*G02F 1/01* (2006.01)

(52) U.S. Cl. .................. 398/198; 398/186; 359/239

(58) Field of Classification Search ............... 398/182, 398/186, 198; 359/239; 372/38.01, 38.02
See application file for complete search history.

(56) References Cited

U.S. PATENT DOCUMENTS

| | | | | |
|---|---|---|---|---|
| 4,306,142 | A | * 12/1981 | Watanabe et al. | ......... 250/201.1 |
| 5,900,621 | A | 5/1999 | Nagakubo et al. | |
| 6,583,910 | B1 | 6/2003 | Satoh | |
| 7,181,146 | B1 | * 2/2007 | Yorks | ......... 398/195 |
| 2005/0128555 | A1 | * 6/2005 | Jang et al. | ......... 359/237 |

FOREIGN PATENT DOCUMENTS

| | | |
|---|---|---|
| JP | 10-123471 | 5/1998 |
| JP | 11-305175 | 11/1999 |

* cited by examiner

*Primary Examiner*—Nathan M Curs
(74) *Attorney, Agent, or Firm*—Fujitsu Patent Center

(57) ABSTRACT

An optical transmitter includes: a modulating unit that modulates an optical signal based on an electric signal; a first detecting unit that detects a first variation width of a maximum output of the modulated optical signal; a second detecting unit that detects a second variation width of a minimum output of the modulated optical signal; a comparing unit that performs a comparison of the first variation width and the second variation width; and an adjusting unit that adjusts a bias potential of the electric signal based on a result of the comparison.

17 Claims, 8 Drawing Sheets

METHOD AND APPARATUS FOR CONTROLLING BIAS POINT OF OPTICAL TRANSMITTER

CROSS-REFERENCE TO RELATED APPLICATIONS

This application is based upon and claims the benefit of priority from the prior Japanese Patent Application No. 2005-307420, filed on Oct. 21, 2005, the entire contents of which are incorporated herein by reference.

BACKGROUND OF THE INVENTION

1. Field of the Invention

The present invention relates to a technology for controlling the bias point of an optical transmitter automatically.

2. Description of the Related Art

A conventional optical transmitter for an optical communication system uses a modulation system, such as a direct modulation system, an internal modulation system, and an external modulation system, which is suitable for a type of a light source and a communication speed. In recent years, the external modulation system having a small variation in the wavelength of an optical signal (that is, a chirping) regardless of a transmission speed calls attention, and has been widely used.

FIG. 8 is a block diagram of a conventional optical transmitter using the external modulation system. As shown in FIG. 8, an optical transmitter 800 includes a light source 810, an external modulator 820, a branch unit 830, a photoelectric converter 840, a feedback unit 850, an oscillator 860, a pulse driver 870, a synchronous detector 880, and a bias controller 890.

The light source 810 generates unmodulated light by a light-emitting element, and outputs the unmodulated light to the external modulator 820. The external modulator 820 modulates the unmodulated light according to electric signals input from the pulse driver 870 and the bias controller 890, and outputs the modulated light to the branch unit 830 as an optical signal. The branch unit 830 branches the optical signal into two parts at a predetermined rate, for example, 9:1. The main part is input to an optical transmission path, while the other part is input to the photoelectric converter 840.

The photoelectric converter 840 converts the optical signal input from the branch unit 830 into an electric signal, and outputs the electric signal to the feedback unit 850. The feedback unit 850 includes a filter 851 and an amplifier 852. Only the low-frequency component of the electric signal from the photoelectric converter 840 passes through the filter 851 to the amplifier 852, which amplifies the low-frequency component and outputs the amplified low-frequency component to the synchronous detector 880.

A reference low-frequency signal is generated by the oscillator 860, and output to the pulse driver 870 and the synchronous detector 880. Transmission data is input to the pulse driver 870 as an input signal, superimposed on the reference low-frequency signal from the oscillator 860, and output to the external modulator 820 as a modulation signal.

The synchronous detector 880 compares the low-frequency component of the electric signal from the amplifier 852 of the feedback unit 850 with the reference low-frequency signal from the oscillator 860, and outputs a signal corresponding to a phase difference to the bias controller 890. The bias controller 890 adjusts the potential of a bias signal (a bias point) to be input to the external modulator 820 based on the signal input from the synchronous detector 880.

As described above, a modulation signal from the pulse driver 870 and the bias signal from the bias controller 890 are input to the external modulator 820. The light transmission factor of the external modulator 820 varies according to the potential of the bias signal. The transmission factor is represented by an extinction characteristics curve specific to each kind of external modulators and each element of the external modulators. In other words, even when a modulation signal of the same amplitude is input, the amplitude of the optical signal output from the external modulator 820 varies greatly depending on the setting of the potential of the bias signal (the bias point). Therefore, in the block diagram of the optical transmitter 800, the optical signal is fed back to the external modulator 820 through the branch unit 830 to maximize the amplitude of the optical signal. Such a technique is disclosed in, for example, Japanese Patent Application Laid-Open No. H10-123471 and Japanese Patent No. 3333133.

However, according to the optical transmitters described in the above documents, the amplitude and the bias point need to be set while monitoring the waveform each time when an optical signal is transmitted, which is troublesome for the user.

Furthermore, the conventional optical transmitter cannot adjust the bias point appropriately when the extinction characteristics of the optical modulator change greatly according to the usage environment or the usage time. Therefore, the amplitude of the modulation signal needs to be set large to achieve the extinction ratio required for the optical transmission, thereby increasing the power consumption.

SUMMARY OF THE INVENTION

It is an object of the present invention to at least solve the problems in the conventional technology.

An optical transmitter according to an aspect of the present invention includes: a modulating unit that modulates an optical signal based on an electric signal input to the modulating unit and outputs a modulated optical signal; a first detecting unit that detects a first variation width of a maximum output of the modulated optical signal; a second detecting unit that detects a second variation width of a minimum output of the modulated optical signal; a comparing unit that performs a comparison of the first variation width and the second variation width; and an adjusting unit that adjusts a bias potential of the electric signal based on a result of the comparison.

A method for an optical transmitter according to another aspect of the present invention includes: modulating an optical signal based on an electric signal and outputs a modulated optical signal; detecting a first variation width of a maximum output of the modulated optical signal; detecting a second variation width of a minimum output of the modulated optical signal; performing a comparison of the first variation width and the second variation width; and adjusting a bias potential of the electric signal based on a result of the comparison.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail below with reference to the accompanying drawings.

Figure 1:
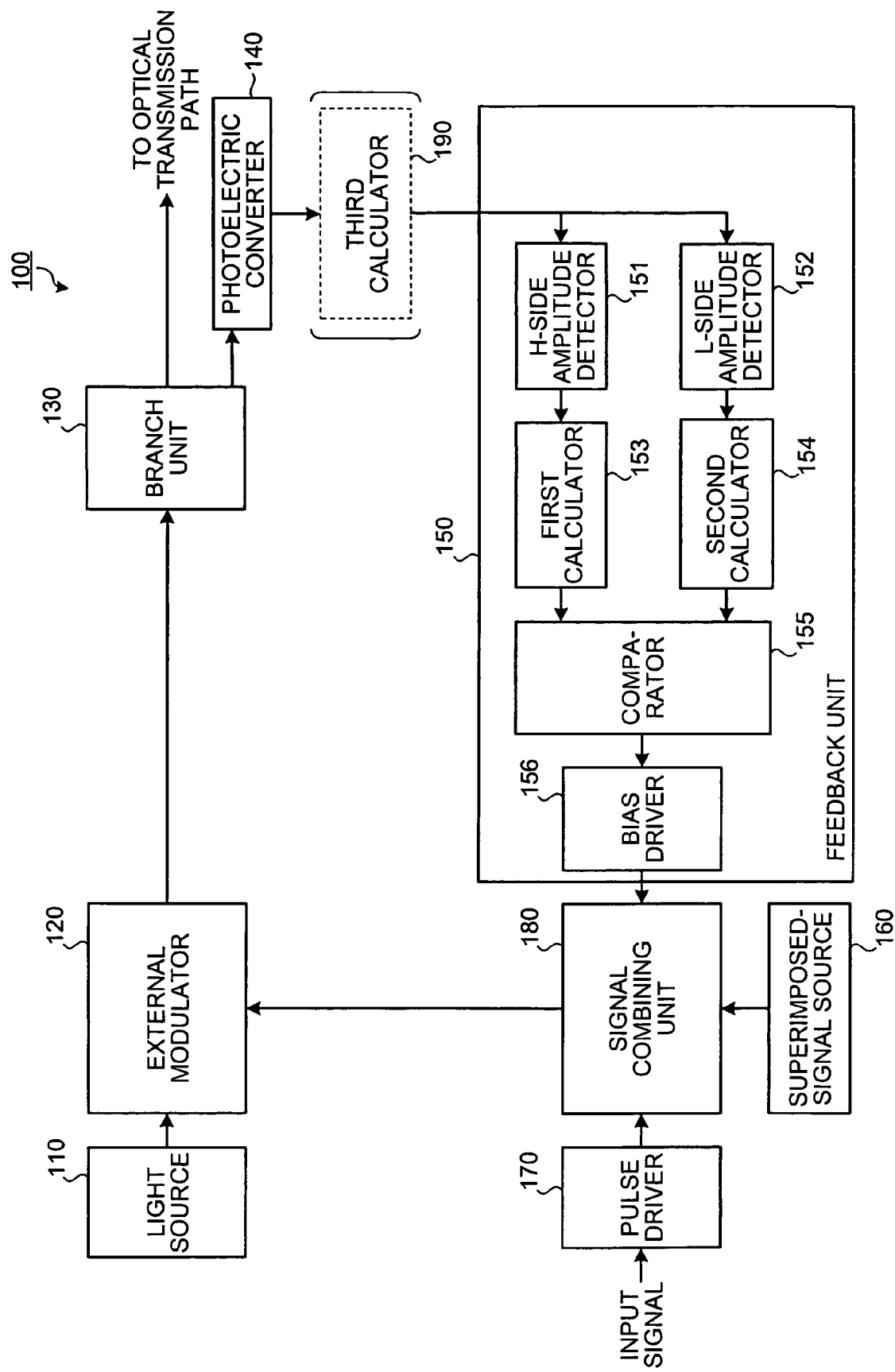
FIG. 1 is a block diagram of an optical transmitter according to the present invention.

FIG. 1 is a block diagram of an optical transmitter according to the present invention. An optical transmitter 100 includes a light source 110, an external modulator 120, a branch unit 130, a photoelectric converter 140, a feedback unit 150, a superimposed-signal source 160, a pulse driver 170, and a signal combining unit 180.

The light source 110 generates unmodulated light by a light-emitting element, and outputs the unmodulated light to the external modulator 120. The external modulator 120 modulates the unmodulated light according to an electric signal input from the signal combining unit 180, and outputs the modulated light to the branch unit 130 as an optical signal. The light transmission factor of the external modulator 120 varies according to the electric signal input from the signal combining unit 180. The external modulator 120 is, for example, a lithium niobate (LN) modulator with a substrate of lithium niobate (LiNbO3), or an electro-absorption (EA) modulator.

Figure 2:
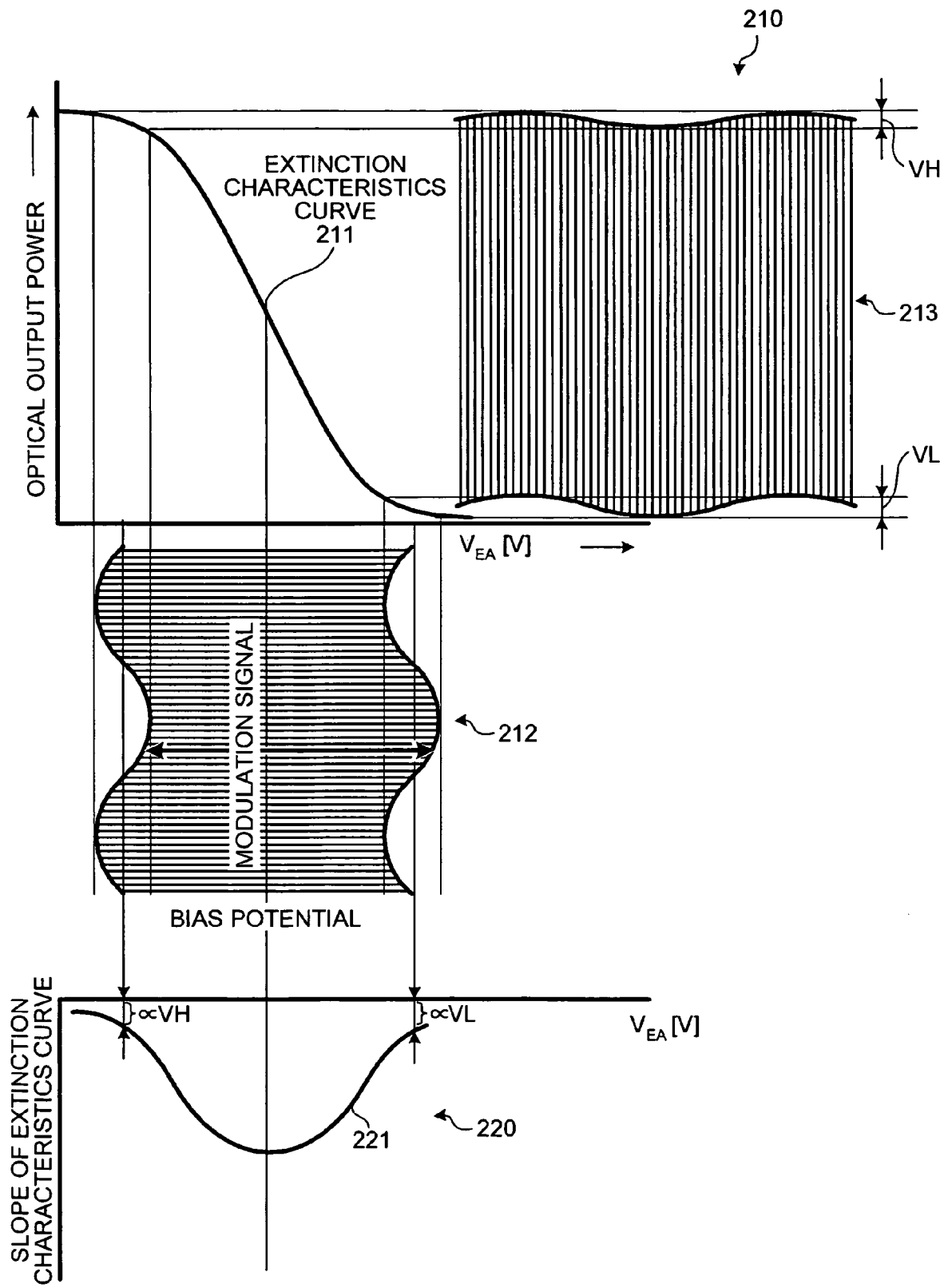
FIG. 2 is a graph for explaining the principle of a bias point control according to the present invention.

FIG. 2 is a graph for explaining the principle of a bias point control according to the present invention. A horizontal axis of a graph 210 represents a voltage VEA (V) of an electric signal input to the external modulator 120, and a vertical axis of the graph 210 represents optical output power of an optical signal output from the external modulator 120. A curve 211 represents extinction characteristics of the external modulator 120 when the external modulator 120 is the EA modulator. A horizontal axis of a graph 220 represents the voltage VEA (V) of the electric signal input to the external modulator 120, and a vertical axis of the graph 220 represents a slope of the curve 211.

When a modulation signal 212 is input to the external modulator 120, the external modulator 120 outputs an optical signal 213. The amplitude of the optical signal 213 corresponds to the amplitude of the modulation signal 212 around the bias signal. A variation width VH represents the variation width of amplitude at the higher side (hereinafter, "H side") of the optical signal 213, and a variation width VL represents the variation width of amplitude at the lower side (hereinafter, "L side") of the optical signal 213.

On the other hand, a curve 221 in the graph 220 represents the slope of the curve 211, in other words, the absolute value of the quotient of □optical output power by □voltage VEA. An end □VH of the curve 221 is proportional to the variation width VH of the optical signal, and an end □VL of the curve 221 is proportional to the variation width VL of the optical signal. Therefore, the bias point can be adjusted at the center of the curve 221, where the slope of the curve 211 becomes maximum, by detecting the variation widths VH and VL and by determining ends □VH and □VL based on the detected variation widths VH and VL. The optical transmitter 100 detects the variation widths VH and VL, performs a predetermined calculation on the variation widths VH and VL, respectively, compares the results of the calculation, and adjusts the bias point.

Referring back to FIG. 1, the external modulator 120 outputs an optical signal to the branch unit 130. The branch unit 130 branches the optical signal into two parts at a predetermined rate, for example, 9:1. The main part is input to an optical transmission path, while the other part is input to the photoelectric converter 140. The photoelectric converter 140 converts the optical signal input from the branch unit 130 into an electric signal, and outputs the electric signal to the feedback unit 150.

The feedback unit 150 includes an H-side amplitude detector 151, an L-side amplitude detector 152, a first calculator 153, a second calculator 154, a comparator 155, and a bias driver 156. The H-side amplitude detector 151 detects the variation width VH of the H-side amplitude of the electric signal input from the photoelectric converter 140. The L-side amplitude detector 152 detects the variation width VL of the L-side amplitude of the electric signal input from the photoelectric converter 140.

The first calculator 153 performs a predetermined calculation on the variation width VH detected by the H-side amplitude detector 151 (for example, the multiplication of the variation width VH by n), and outputs the result to the comparator 155. The second calculator 154 performs a predetermined calculation on the variation width VL detected by the L-side amplitude detector 152 (for example, the multiplication of the variation width VL by n), and outputs the result to the comparator 155. Alternatively, the first calculator 153 and the second calculator 154 can output the detected variation widths as it is. The type of calculation is set in advance depending on the usage mode, as described in detail later.

The comparator 155 compares the results, and outputs the result of the comparison to the bias driver 156. The bias driver 156 outputs, to the signal combining unit 180, a bias signal corresponding to a bias point adjusted based on the comparison result.

A superimposed signal is generated by the superimposed-signal source 160, and output to the signal combining unit 180. Transmission data is input to the pulse driver 170 as an input signal, and output to the signal combining unit 180. The signal combining unit 180 superimposes the input signal from the pulse driver 170 on the superimposed signal from the superimposed-signal source 160, thereby generating a modulation signal. The signal combining unit 180 further combines the modulation signal with the bias signal input from the bias driver 156, and outputs the combined signal to the external modulator 120.

The optical transmitter 100 can also include a third calculator 190 between the photoelectric converter 140 and the feedback unit 150. The third calculator 190 calculates the logarithm of the electric signal input from the photoelectric converter 140, and outputs the logarithm to the feedback unit 150. The configuration including the third calculator 190 is effective when the logarithm of the extinction characteristics of the external modulator 120 has the waveform as shown by the curve 221.

Figure 3:
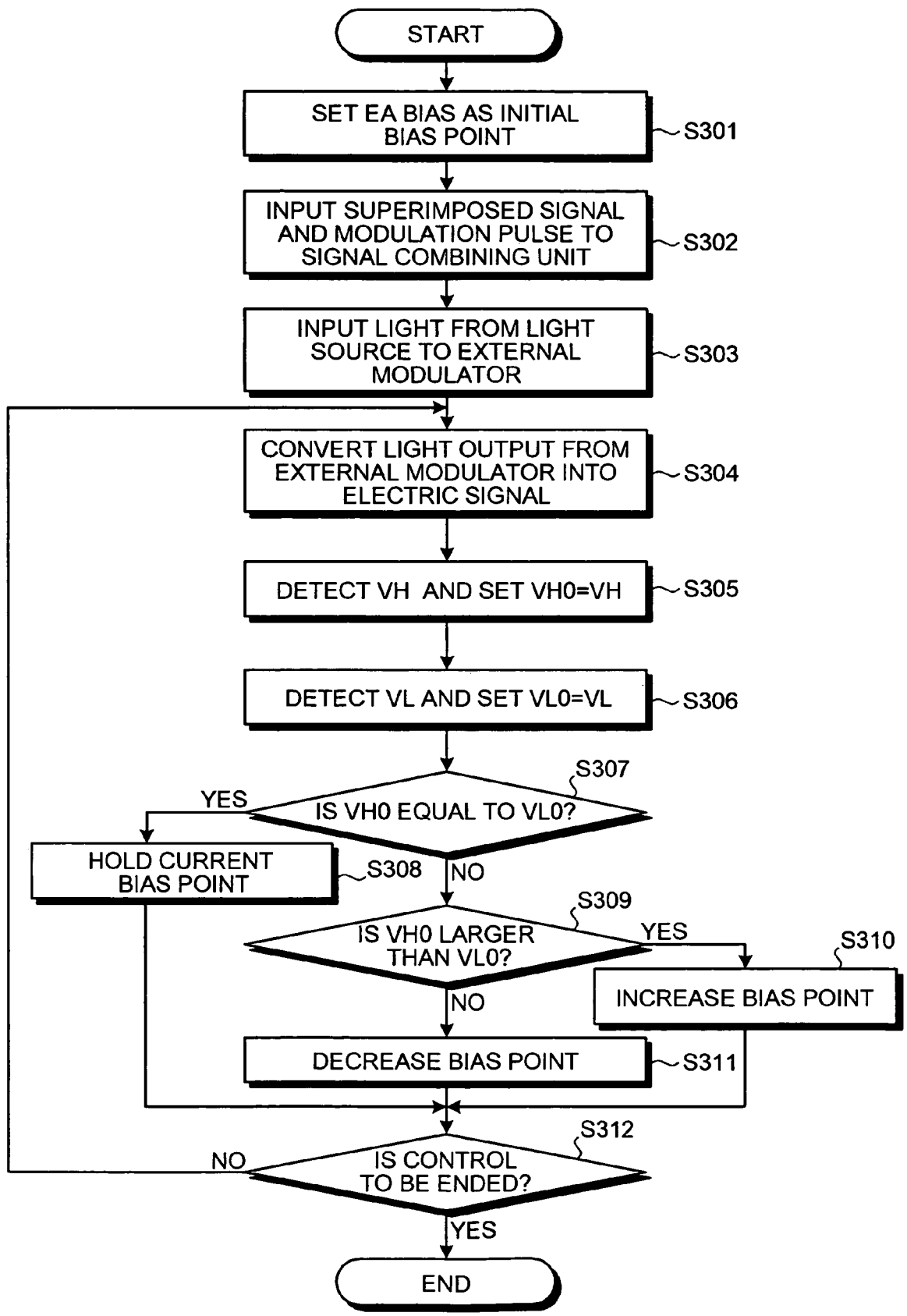
FIG. 3 is a flowchart of a bias point control according to a first embodiment of the present invention.

A procedure of a bias point control according to a first embodiment of the present invention is explained next with reference to FIG. 3. The bias point control according to the first embodiment is the most basic one, which can be widely applied to modulators having point-symmetric extinction characteristics as shown in FIG. 2. As shown in FIG. 3, the bias driver 156 sets an EA bias as an initial bias point (step S301). A superimposed signal from the superimposed-signal source 160 and a modulation pulse from the pulse driver 170 are input to the signal combining unit 180 (step S302). The light source 110 inputs light to the external modulator 120 (step S303). The photoelectric converter 140 converts the light output from the external modulator 120 into an electric signal (step S304).

The H-side amplitude detector 151 detects the variation width VH based on the H-side amplitude of the electric signal, and sets the detected VH to a comparison value VLH (step S305). The L-side amplitude detector 152 detects the variation width VL based on the L-side amplitude of the electric signal, and sets the detected VL to a comparison value VL0 (step S306).

Thereafter, the comparator 155 determines whether the comparison value VLH and the comparison value VL0 are equal (step S307). When the comparison value VLH is equal to the comparison value VL0 (step S307: Yes), the current setting of the bias is held (step S308), and the process proceeds to step S312. When the comparison value VLH is not equal to the comparison value VL0 (step S307: No), it is determined whether the comparison value VLH is larger than the comparison value VL0 (step S309).

When the comparison value VLH is larger than the comparison value VL0 (step S309: Yes), the bias driver 156 increases the bias point (in other words, shift the bias potential of the modulation signal 212 shown in FIG. 2 to the left side) (step S310), and the process proceeds to step S312. When the comparison value VLH is smaller than the comparison value VL0 (step S309: No), the bias driver 156 decreases the bias point (in other words, shift the bias potential of the modulation signal 212 shown in FIG. 2 to the right side) (step S311), and the process proceeds to step S312.

Then, it is determined whether the control should be ended (step S312). When the control is to be continued (step S312: No), the series of process from step S304 to S312 is repeated. When the control is to be ended (step S312: Yes), the series of process ends.

A procedure of a bias point control according to a second embodiment of the present invention is explained next with reference to FIGS. 4 and 5. The bias point control can be widely applied to modulators having different extinction characteristics from that shown in FIG. 2, that is, point-asymmetrical extinction characteristics shown in FIG. 4. A horizontal axis of a graph 410 represents a voltage VEA (V) of an electric signal input to the external modulator 120, and a vertical axis of the graph 410 represents optical output power of an optical signal output from the external modulator 120. A curve 411 represents extinction characteristics of the external modulator 120. A horizontal axis of a graph 420 represents the voltage VEA (V) of the electric signal input to the external modulator 120, and a vertical axis of the graph 420 represents a slope of the curve 411.

When a modulation signal 412 is input to the external modulator 120, the external modulator 120 outputs an optical signal 413. The amplitude of the optical signal 413 corresponds to the amplitude of the modulation signal 412 around the bias signal. A variation width VH represents the variation width of amplitude at the H side of the optical signal 413, and a variation width VL represents the variation width of amplitude at the L side of the optical signal 413. On the other hand, a curve 421 in the graph 420 represents the slope of the curve 411. An end DVH of the curve 421 is proportional to the variation width VH of the optical signal, and an end □VL of the curve 421 is proportional to the variation width VL of the optical signal.

The curve 211 shown in FIG. 2 represents the extinction characteristics of a general EA modulator, which is substantially point symmetrical with respect to the point where its slope reaches the maximum. On the other hand, the extinction characteristics of the external modulator 120 used in the second embodiment is not point symmetrical as shown in FIG. 4. Specifically, as shown by the curve 421, the slope of extinction characteristics is small at the H side, and large at the L side.

In the second embodiment, the bias point cannot be adjusted to an appropriate value (that is, a voltage maximizing the slope of the extinction characteristics) by keeping the end □VL equal to the end DVH as in the first embodiment. Therefore, in the second embodiment, the bias point is adjusted so that n times the end □VL of the curve 421 becomes equal to the end □VH. By setting the value of n appropriately, the bias point can be shifted to the position where the slope of the curve 421 reaches the maximum. Therefore, in the second embodiment, either the variation width VH detected by the H-side amplitude detector 151 or the variation width VL detected by the L-side amplitude detector 152 is multiplied by n, and the product is set as the comparison value.

Figure 5:
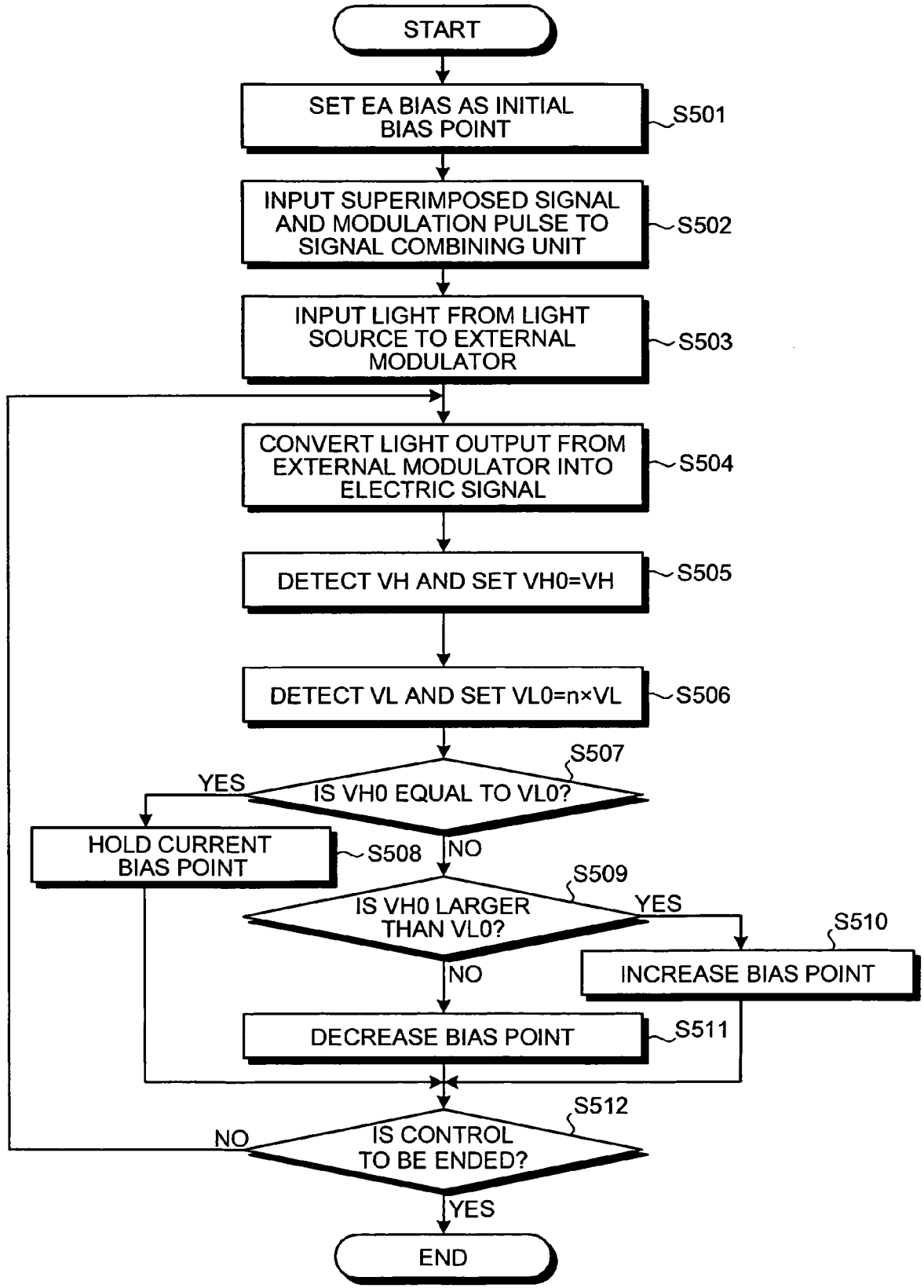
FIG. 5 is a flowchart of a bias point control according to the second embodiment.

FIG. 5 is a flowchart of the bias point control according to the second embodiment. The bias driver 156 sets the EA bias as the initial bias point (step S501). A superimposed signal from the superimposed-signal source 160 and a modulation pulse from the pulse driver 170 are input to the signal combining unit 180 (step S502). The light source 110 inputs light to the external modulator 120 (step S503). The photoelectric converter 140 converts the light output from the external modulator 120 into an electric signal (step S504).

The variation width VH is detected by the H-side amplitude detector 151 based on the H-side amplitude of the electric signal, and the detected VH is set to the comparison value VLH (step S505). The variation width VL is detected by the L-side amplitude detector 152 based on the L-side amplitude of the electric signal, multiplied by n by the second calculator 154, and the product is set to the comparison value VL0 (step S506).

Thereafter, the comparator 155 determines whether the comparison value VLH and the comparison value VL0 are equal (step S507). When the comparison value VLH is equal to the comparison value VL0 (step S507: Yes), the current setting of the bias is held (step S508), and the process proceeds to step S512. When the comparison value VLH is not equal to the comparison value VL0 (step S507: No), it is determined whether the comparison value VLH is larger than the comparison value VL0 (step S509).

When the comparison value VLH is larger than the comparison value VL0 (step S509: Yes), the bias driver 156 increases the bias point (step S510), and the process proceeds to step S512. When the comparison value VLH is smaller than the comparison value VL0 (step S509: No), the bias driver 156 decreases the point (step S511), and the process proceeds to step S512.

Then, it is determined whether the control should be ended (step S512). When the control is to be continued (step S512: No), the series of process from step S504 to S512 is repeated. When the control is to be ended (step S512: Yes), the series of process ends.

Figure 4:
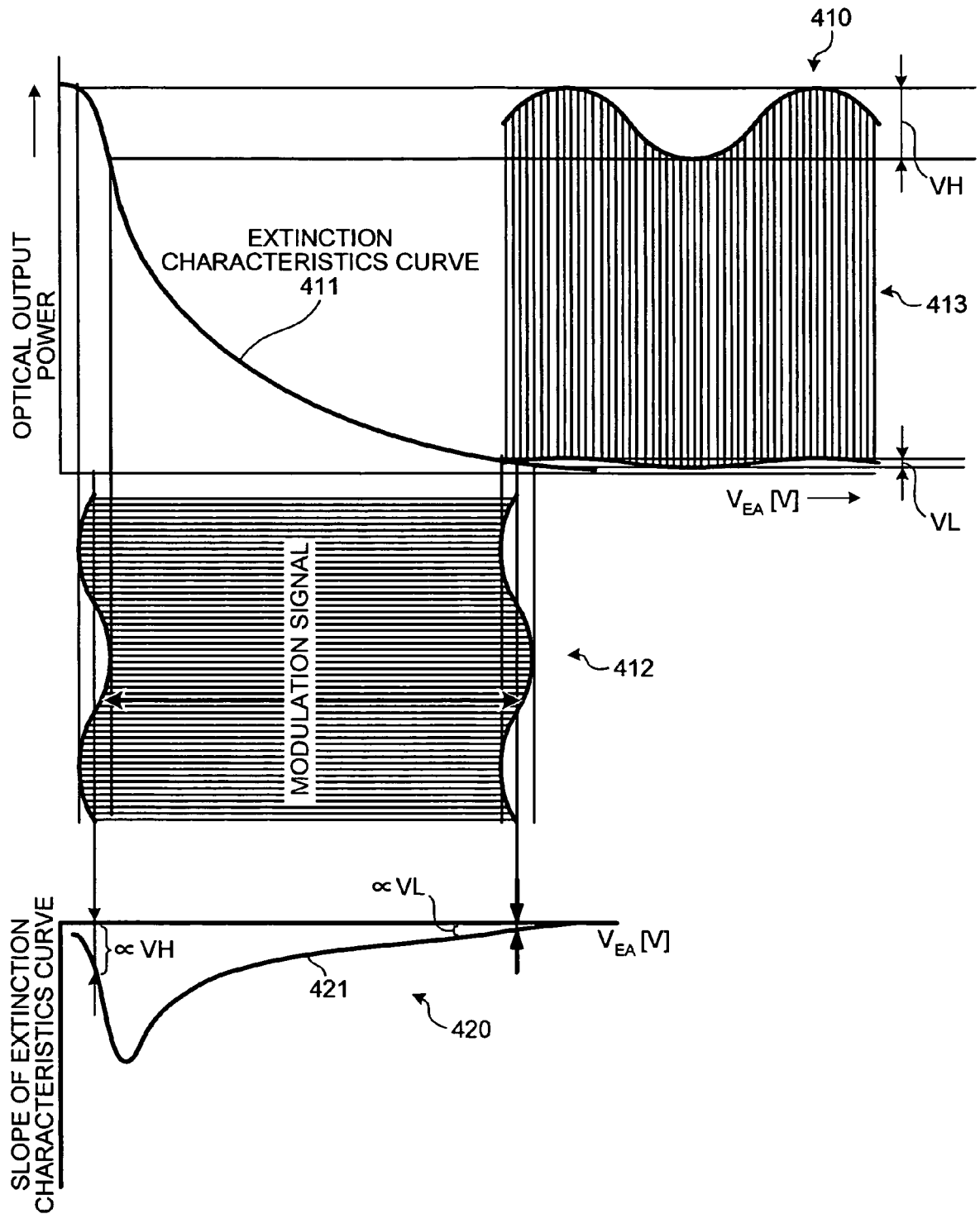
FIG. 4 is a graph for explaining the principle of a bias point control according to a second embodiment of the present invention.

The bias point control explained above assumes that the external modulator 120 has the extinction characteristics as shown in FIG. 4, in which the end □VH of the curve 421 is larger than the end DVL. However, when the external modulator 120 has extinction characteristics in which the end □VH is smaller than the end □VL, the variation width VH is multiplied by n and set to the comparison value VLH at step S505, and the variation width VL is set to the comparison value VL0 as it is at step S506.

A procedure of a bias point control according to a third embodiment of the present invention is explained next with reference to FIG. 6. The bias point control can be widely applied to modulators having point-symmetric extinction characteristics as shown in FIG. 2, to minimize the sum of the variation widths VH and VL.

Figure 6:
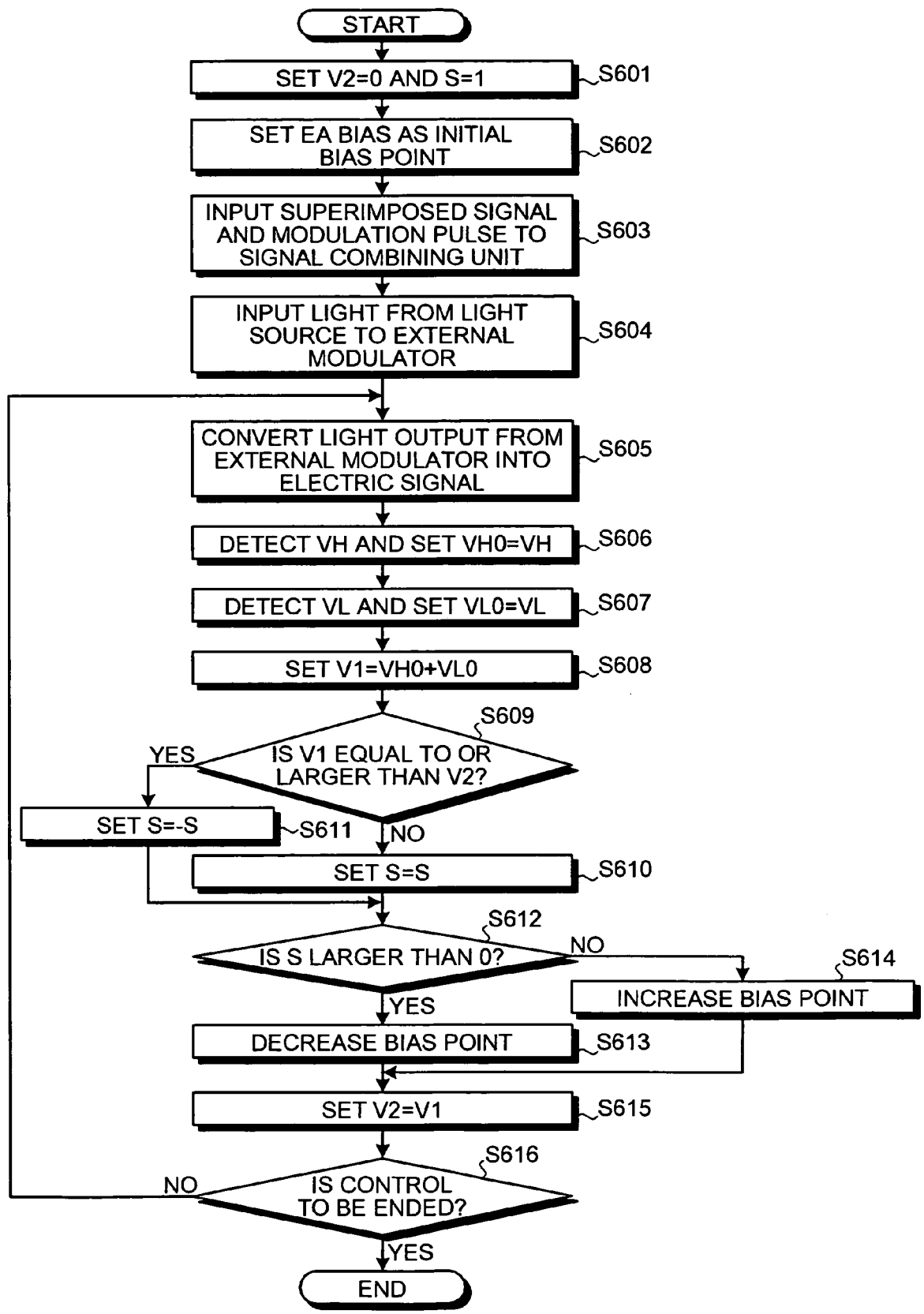
FIG. 6 is a flowchart of a bias point control according to a third embodiment of the present invention.

FIG. 6 is a flowchart of the bias control according to the third embodiment. A reference potential V2 for the comparator 155 is set to 0, and a variable S is set to 1 (step S601). The bias driver 156 sets the EA bias as the initial bias point (step S602). A superimposed signal from the superimposed-signal source 160 and a modulation pulse from the pulse driver 170 are input to the signal combining unit 180 (step S603). The light source 110 inputs light to the external modulator 120 (step S604). The photoelectric converter 140 converts the light output from the external modulator 120 into an electric signal (step S605).

The H-side amplitude detector 151 detects the variation width VH based on the H-side amplitude of the electric signal, and sets the detected VH to the comparison value VLH (step S606). The L-side amplitude detector 152 detects the variation width VL based on the L-side amplitude of the electric signal, and sets the detected VL to the comparison value VL0 (step S607). VL0 (step S607).

Thereafter, the sum of the comparison values VLH and VL0 is set to a variable V1 (step 5608). When the value of variable V1 is equal to or larger than that of the variable V2 (step S609: Yes), the variable S is set to −S (step S611). When the value of variable V1 is smaller than that of the variable V2 (step S609: No), the variable S is set to S (step S610).

Then, it is determined whether the value of variable S is larger than 0 (step S612). When the value of variable S is larger than 0 (step S612: Yes), the bias driver 156 decreases the bias point (step S613). When the value of variable S is not larger than 0 (step S612: No), the bias driver 156 increases the bias point (step S614).

Then, the value of variable V2 is set to the variable V1 (step S615), and it is determined whether the control should be ended (step S616). When the control is to be continued (step S616: No), the series of process from step S605 to S616 is repeated. When the control is to be ended (step S616: Yes), the series of process ends.

Figure 7:
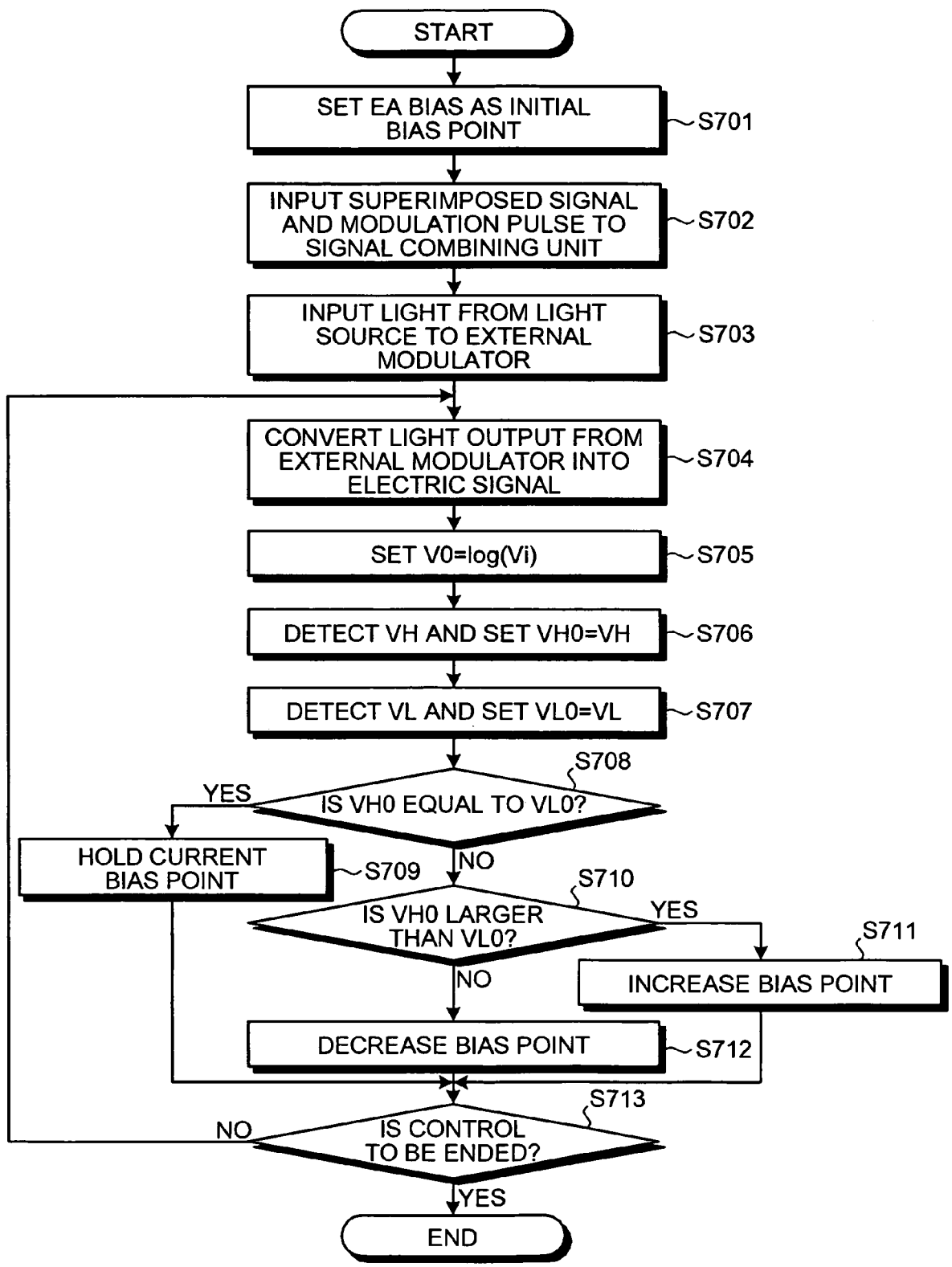
FIG. 7 is a flowchart of a bias point control according to a fourth embodiment of the present invention.
Figure 8:
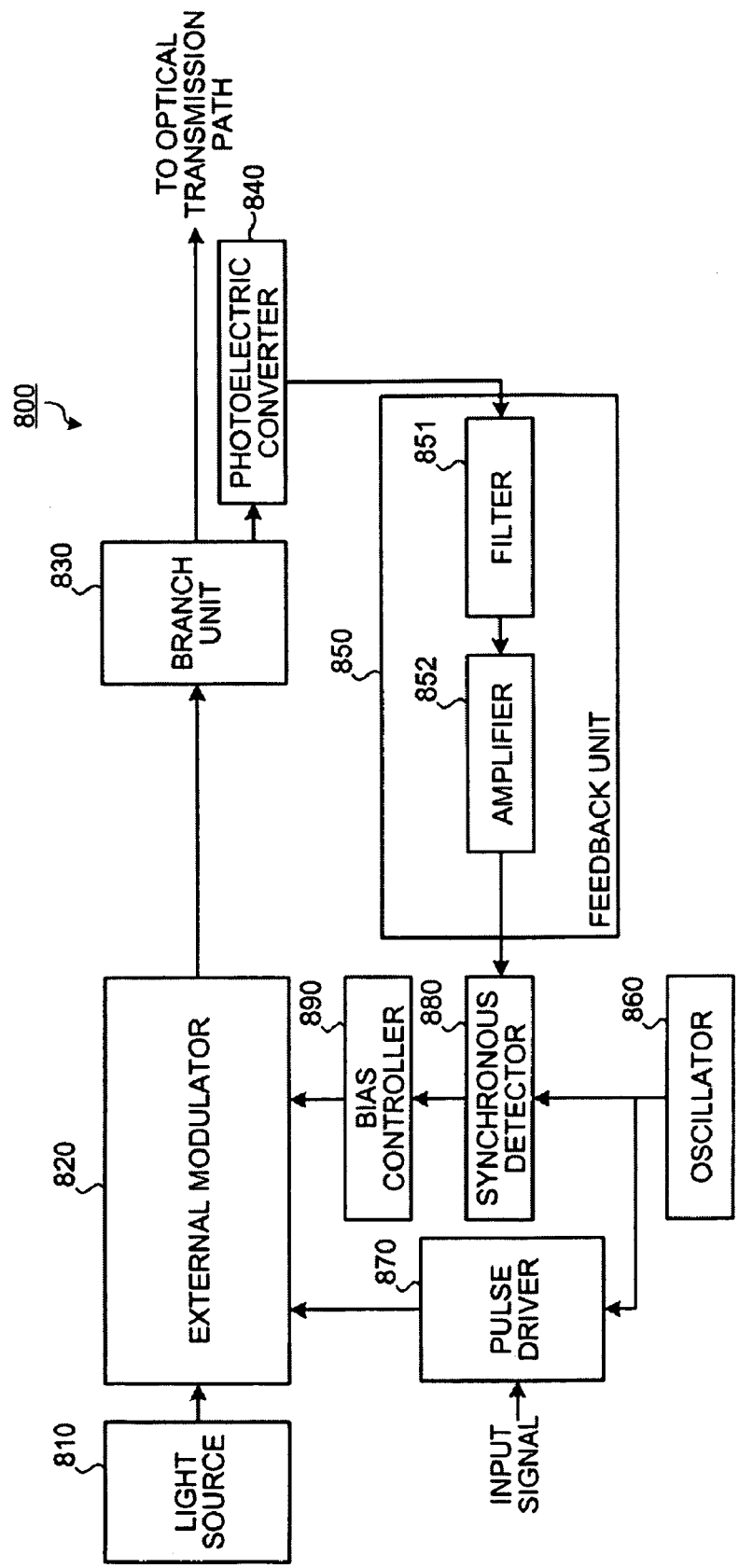
FIG. 8 is a block diagram of a conventional optical transmitter.

A procedure of a bias point control according to a fourth embodiment of the present invention is explained next with reference to FIG. 7. The bias point control is for the optical transmitter 100 with the third calculator 190. FIG. 7 is a flowchart of the bias point control according to the fourth embodiment. The bias driver 156 sets the EA bias as the initial bias point (step S701). A superimposed signal from the superimposed-signal source 160 and a modulation pulse from the pulse driver 170 are input to the signal combining unit 180 (step S702). The light source 110 inputs light to the external modulator 120 (step S703). The photoelectric converter 140 converts the light output from the external modulator 120 into an electric signal (step S704).

The third calculator 190 calculates the logarithm V0 of the output Vi of the electric signal, and outputs the logarithm V0 to the feedback unit 150 (step S705).

Thereafter, the H-side amplitude detector 151 detects the variation width VH based on the logarithm V0 and sets the detected VH to the comparison value VLH (step S705). The L-side amplitude detector 152 detects the variation width VL based pm the logarithm V0, 7570 and sets the detected VL to the comparison value VL0 (step S707).

Thereafter, the comparator 155 determines whether the comparison value VLH and the comparison value VL0 are equal (step S708). When the comparison value VLH is equal to the comparison value VL0 (step S708: Yes), the current setting of the bias is held (step S709), and the process proceeds to step S713. When the comparison value VLH is not equal to the comparison value VL0 (step S708: No), it is determined whether the comparison value VLH is larger than the comparison value VL0 (step S710).

When the comparison value VLH is larger than the comparison value VL0 (step S710: Yes), the bias driver 156 increases the bias point (step S711), and the process proceeds to step S713. When the comparison value VLH is smaller than the comparison value VL0 (step S710: No), the bias driver 156 decreases the bias point (step S712), and the process proceeds to step S713.

Then, it is determined whether the control should be ended (step S713). When the control is to be continued (step S713: No), the series of process from step S704 to S713 is repeated. When the control is to be ended (step S713: Yes), the series of process ends.

As explained above, according to the present invention, the bias point can be adjusted automatically, and an optimum light transmission factor can be maintained.

The optical transmitter 100 according to the present invention detects the variation widths VH and VL based on an optical signal each time when the optical signal is output. Therefore, the bias point can be adjusted to a suitable point according to a change of extinction characteristics due to temperature. Consequently, the optical transmitter 100, which is compact and does not require an automatic temperature control (ATC) circuit, can be provided at low cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmitter comprising:
    a modulating unit configured to modulate an optical signal based on an input signal input to the modulating unit and output a modulated optical signal;
    a first detecting unit configured to detect a first variation in amplitude of a maximum output of the modulated optical signal;
    a second detecting unit configured to detect a second variation in amplitude of a minimum output of the modulated optical signal;
    a comparing unit configured to perform a comparison of the first variation and the second variation; and
    an adjusting unit configured to adjust a bias potential of the input signal based on a result of the comparison.

2. The optical transmitter according to claim 1, further comprising:
    a first variation adjusting unit configured to adjust the first variation by performing a calculation on the first variation; and
    a second variation adjusting unit configured to adjust the second variation by performing a calculation on the second variation, wherein
    the comparing unit performs a comparison of the adjusted first variation and the adjusted second variation.

3. The optical transmitter according to claim 1, wherein the adjusting unit adjusts the bias potential so that the first variation and the second variation become equal when an extinction characteristics curve of the modulating unit is substantially point symmetrical with respect to a point where a slope of the extinction characteristics curve reaches a maximum.

4. The optical transmitter according to claim 1, wherein the adjusting unit adjusts the bias potential so that a product of the first variation and n, where n is a positive integer, and the second variation become equal when an extinction characteristics curve of the modulating unit is point asymmetrical with respect to a point where a slope of the extinction characteristics curve reaches a maximum.

5. The optical transmitter according to claim 1, wherein the adjusting unit adjusts the bias potential so that the first variation and a product of the second variation and n, where n is a positive integer, become equal when an extinction characteristics curve of the modulating unit is point asymmetrical with respect to a point where a slope of the extinction characteristics curve reaches a maximum.

6. The optical transmitter according to claim 1, wherein
the adjusting unit adjusts the bias potential so that a sum of the first variation and the second variation becomes equal to a reference value.

7. The optical transmitter according to claim 1, further comprising:
a calculating unit configured to calculate a logarithm of the modulated optical signal and outputs the logarithm to the first detecting unit and the second detecting unit.

8. The optical transmitter according to claim 1, wherein the modulating unit has extinction characteristics of an electro-absorption modulator.

9. The optical transmitter according to claim 1, wherein the input signal is an electric signal.

10. A method for an optical transmitter, comprising:
modulating an optical signal based on an input signal;
outputting the modulated optical signal;
detecting a first variation in amplitude of a maximum output of the modulated optical signal;
detecting a second variation in amplitude of a minimum output of the modulated optical signal;
performing a comparison of the first variation and the second variation; and
adjusting a bias potential of the input signal based on a result of the comparison.

11. The method according to claim 10, further comprising:
performing a first-variation calculation on the first variation;
adjusting the first variation based on the first-variation calculation;
performing a second-variation calculation on the second variation;
adjusting the second variation based on the second-variation calculation; and wherein
the adjusted first variation and the adjusted second variation are compared in the comparison.

12. The method according to claim 10, wherein
the adjusting adjusts the bias potential so that the first variation and the second variation become equal when an extinction characteristics curve of the modulating unit is substantially point symmetrical with respect to a point where a slope of the extinction characteristics curve reaches a maximum.

13. The method according to claim 10, wherein
the adjusting includes adjusting the bias potential so that a product of the first variation and n, where n is a positive integer, and the second variation become equal when an extinction characteristics curve of the modulating unit is point asymmetrical with respect to a point where a slope of the extinction characteristics curve reaches a maximum.

14. The method according to claim 10, wherein
the adjusting includes adjusting the bias potential so that the first variation and a product of the second variation and n, where n is a positive integer, become equal when an extinction characteristics curve of the modulating unit is point asymmetrical with respect to a point where a slope of the extinction characteristics curve reaches a maximum.

15. The method according to claim 10, wherein
the adjusting includes adjusting the bias potential so that a sum of the first variation and the second variation becomes equal to a reference value.

16. The method according to claim 10, wherein the input signal is an electric signal.

17. An optical transmitter comprising:
a modulating unit configured to modulate an optical signal based on an electric signal input to the modulating unit and to output a modulated optical signal;
a first detecting unit configured to detect a first variation width of a maximum output of the modulated optical signal;
a second detecting unit configured to detect a second variation width of a minimum output of the modulated optical signal;
a comparing unit configured to set a sum of the first variation width and the second variation width to a variable V1, and to perform a comparison of the variable V1 and a reference value V2; and
an adjusting unit configured to adjust a bias potential of the electric signal based on a result of the comparison.

\* \* \* \* \*